(12) United States Patent
Yu-Tseng et al.

(10) Patent No.: US 11,861,285 B2
(45) Date of Patent: Jan. 2, 2024

(54) ELECTROMIGRATION EVALUATION METHODOLOGY WITH CONSIDERATION OF CURRENT DISTRIBUTION

(71) Applicant: TAIWAN SEMICONDUCTOR MANUFACTURING COMPANY LTD., Hsinchu (TW)

(72) Inventors: Hsien Yu-Tseng, Miaoli County (TW); Wei-Ming Chen, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 418 days.

(21) Appl. No.: 17/070,579

(22) Filed: Oct. 14, 2020

(65) Prior Publication Data

US 2022/0114323 A1    Apr. 14, 2022

(51) Int. Cl.
*G06F 30/398* (2020.01)
*G06F 30/392* (2020.01)
*G06F 119/18* (2020.01)
*G06F 119/08* (2020.01)

(52) U.S. Cl.
CPC .......... *G06F 30/398* (2020.01); *G06F 30/392* (2020.01); *G06F 2119/08* (2020.01); *G06F 2119/18* (2020.01)

(58) Field of Classification Search
USPC ........................................ 716/111
See application file for complete search history.

(56) References Cited

U.S. PATENT DOCUMENTS

2007/0244676 A1* 10/2007 Shang ............... G06F 30/23 703/2
2015/0370937 A1* 12/2015 Liu ................... G06F 30/367 703/14

* cited by examiner

*Primary Examiner* — Bryce M Aisaka
(74) *Attorney, Agent, or Firm* — WPAT LAW; Anthony King

(57) ABSTRACT

The present disclosure provides a method for evaluating a heat sensitive structure. The method includes identifying a heat sensitive structure in an integrated circuit design layout and identifying a heat generating structure in the integrated circuit design layout. The method also includes calculating an operating temperature of the heat generating structure by taking a practical current distribution into consideration. The method also includes calculating an anticipated temperature increase for the heat sensitive structure induced by thermal coupling of the heat generating structure at the operating temperature.

20 Claims, 6 Drawing Sheets

ELECTROMIGRATION EVALUATION METHODOLOGY WITH CONSIDERATION OF CURRENT DISTRIBUTION

This application is related to applicant's previously filed U.S. Appln. Ser. No. 62/720,475, filed on Aug. 21, 2018 and U.S. application Ser. No. 16/425,862, filed on May 29, 2019, which are herein incorporated by reference.

BACKGROUND

Electromigration (EM) occurs when electrical current runs through a conductive line, wherein the momentum transfer between the conducting electrons and the metal atoms impels metal atoms in the direction of the electron flow, shifting from their original positions and increasing non-uniformity of the conductive line.

Over time, EM generates hillocks (accumulated excess metal) and/or voids (depleted original metal) in the conductive line which, in turn, results in short circuits (in the presence of hillocks) or open circuits (in the presence of voids).

BRIEF DESCRIPTION OF THE DRAWINGS

Aspects of the present disclosure are best understood from the following detailed description when read with the accompanying figures. It is emphasized that, in accordance with standard practice in the industry, various features are not drawn to scale. In fact, the dimensions of the various features may be arbitrarily increased or reduced for clarity of discussion.

DETAILED DESCRIPTION

Figure 1:
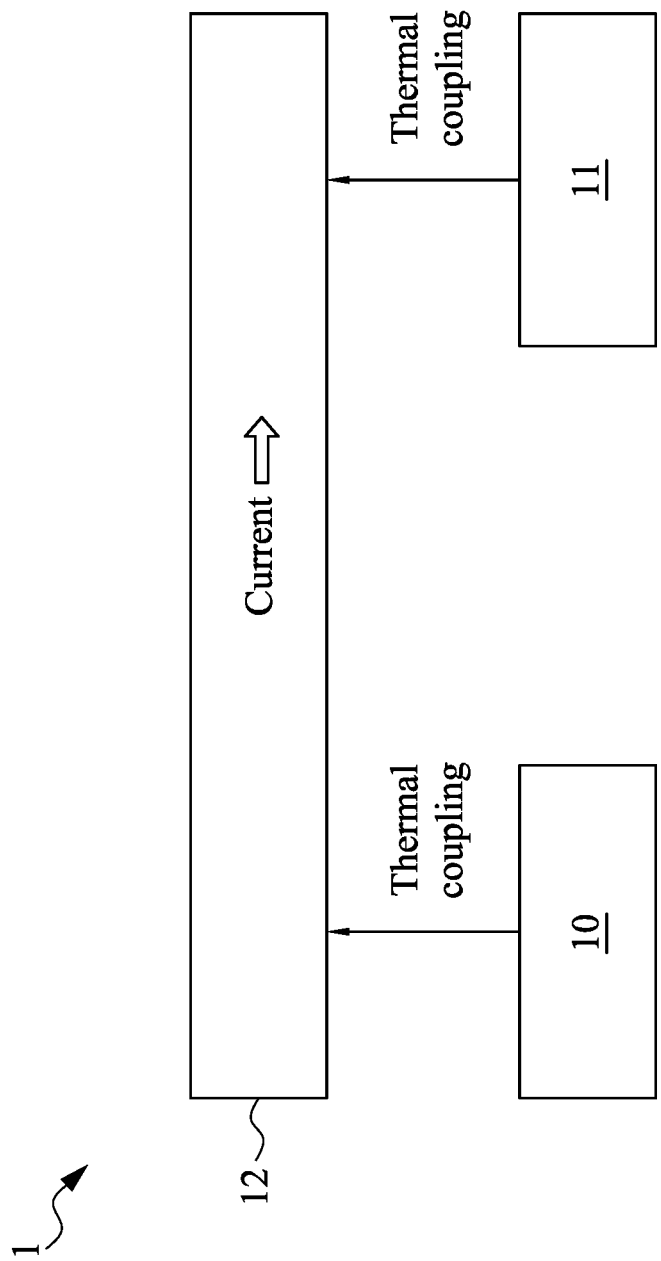
FIG. 1 is a block diagram of a semiconductor device in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments, or examples, illustrated in the drawings are disclosed as follows using specific language. It will nevertheless be understood that the embodiments and examples are not intended to be limiting. Any alterations or modifications in the disclosed embodiments, and any further applications of the principles disclosed in this document are contemplated as would normally occur to one of ordinary skill in the pertinent art.

Further, it is understood that several processing steps and/or features of a device may be only briefly described. Also, additional processing steps and/or features can be added, and certain of the following processing steps and/or features can be removed or changed while still implementing the claims. Thus, the following descriptions should be understood to represent examples only, and are not intended to suggest that one or more steps or features are required.

In addition, the present disclosure may repeat reference numerals and/or letters in the various examples. This repetition is for the purpose of simplicity and clarity and does not in itself dictate a relationship between the various embodiments and/or configurations discussed.

FIG. 1 is a block diagram of a semiconductor device 1 in accordance with some embodiments of the present disclosure.

The semiconductor device 1 includes heat generating structures (which may also be referred to as heat sources) 10 and 11, and a conductive line segment 12.

Each of the heat generating structures 10 and 11 may be or may include any device or element present on the semiconductor device 1 that may contribute to heating the conductive line segment 12 during the operation of the semiconductor device 1.

In some embodiments, each of the heat generating structures 10 and 11 may be a chip or a die including a semiconductor substrate, one or more integrated circuit devices and one or more overlying interconnection structures therein. The integrated circuit devices may include active devices such as transistors and/or passive devices such as resistors, capacitors, inductors, or a combination thereof. In some embodiments, the heat generating structure 10 may be or may include a metal-oxide-semiconductor field-effect transistor (MOSFET), such as a complementary MOS (CMOS), a fin field effect transistor (FinFET), an n-channel MOSFET, a p-channel MOSFET, or a combination thereof. In some embodiments, the heat generating structure 11 may be or may include a high-resistance (Hi-R) element. In some embodiments, the Hi-R element may be non-metallic.

In some embodiments, the conductive line segment 12 may include a conductive line including a plurality of metal atoms, selected from a group of metals including, e.g., aluminum (Al), copper (Cu), titanium (Ti), tantalum (Ta), tungsten (W), platinum (Pt), cobalt (Co) and, in some embodiments, one or more alloying metals or other elements including nickel (Ni), nitrogen (N), and silicon (Si). The conductive line segment 12 forms a conductive path for electrons moving between a cathode and an anode.

EM occurs when electrical current runs through a conductive line (such as the conductive line segment 12) and the electrons transfer a portion of their momentum to the metal atoms of the conductive line, thereby impelling the metal atoms in the direction of the electron flow.

Repeated transfers of momentum from the electrons to the metal atoms during operation of a semiconductor device (such as the semiconductor device 1) will gradually shift the metal atoms from their original positions, thereby increasing the non-uniformity of the conductive line.

In those regions of the conductive line in which the movement of the metal atoms reduces the cross-section of the conductive line, the current density will increase and further exacerbate both the self-heating effect and EM in the thinned region(s). Conductive lines incorporating such thinned regions will exhibit increased resistance and will typically lead to reduced performance and, eventually, a void or an open circuit. Conversely, in those regions of the conductive line in which the movement of the metal atoms increases the cross-section of the conductive line, the thickened regions, e.g., hillocks, will tend to stress the surrounding materials and eventually compromise the structural integrity of the surrounding materials and/or create short circuit to an adjacent conductive line or other conductor.

Over time, EM increases the non-uniformity of the conductive line and causes the formation of hillocks (accumulation of excess metal) and/or voids (depletion of initial metal) in the conductive line which, in turn, tends to result in short circuits (in the presence of hillocks) or open circuits (in the presence of voids).

To avoid EM-related failures of the semiconductor device, EM evaluation, analysis, and signoff methodologies may be applied to estimate a mean time to failure (MTTF) for a conductive line caused by EM. A simulated integrated circuit design that passes the applicable EM requirements may be approved for EM signoff and tape-out for use in manufacturing a semiconductor device.

In some embodiments, an EM evaluation considers various thermal effects, such as self-heating of heat generating structure(s) (which may experience some degree of self-heating during operation) and thermal coupling on heat sensitive structure(s).

For example, the heat generating structures 10 and 11, and the conductive line segment 12 may experience some degree of self-heating during the operation of the semiconductor device 1, and thus may be considered heat generating structures in an EM evaluation. Therefore, the self-heating effects of the heat generating structures 10 and 11, and the conductive line segment 12 may be taken into consideration in an EM evaluation.

In addition, a portion of the heat generated from the heat generating structures 10 and 11 may be transferred to conductive line segment 12 and coupled with inherent current/resistance (IR) heating (also referred to as ohmic or joule heating) of the conductive line segment 12, increasing the risk of EM-related failure. For example, at least a portion of the heat generated from the FinFET semiconductor device may, in turn, be transferred to the conductive lines through direct contact with the transistor and via conduction through intervening materials, e.g., layers of interlayer dielectric (ILD) material(s).

Therefore, an EM evaluation also considers the increased operating temperature of the conductive line segment 12 resulting from or induced by thermal coupling from heat generating structures 10 and 11.

Figure 2:
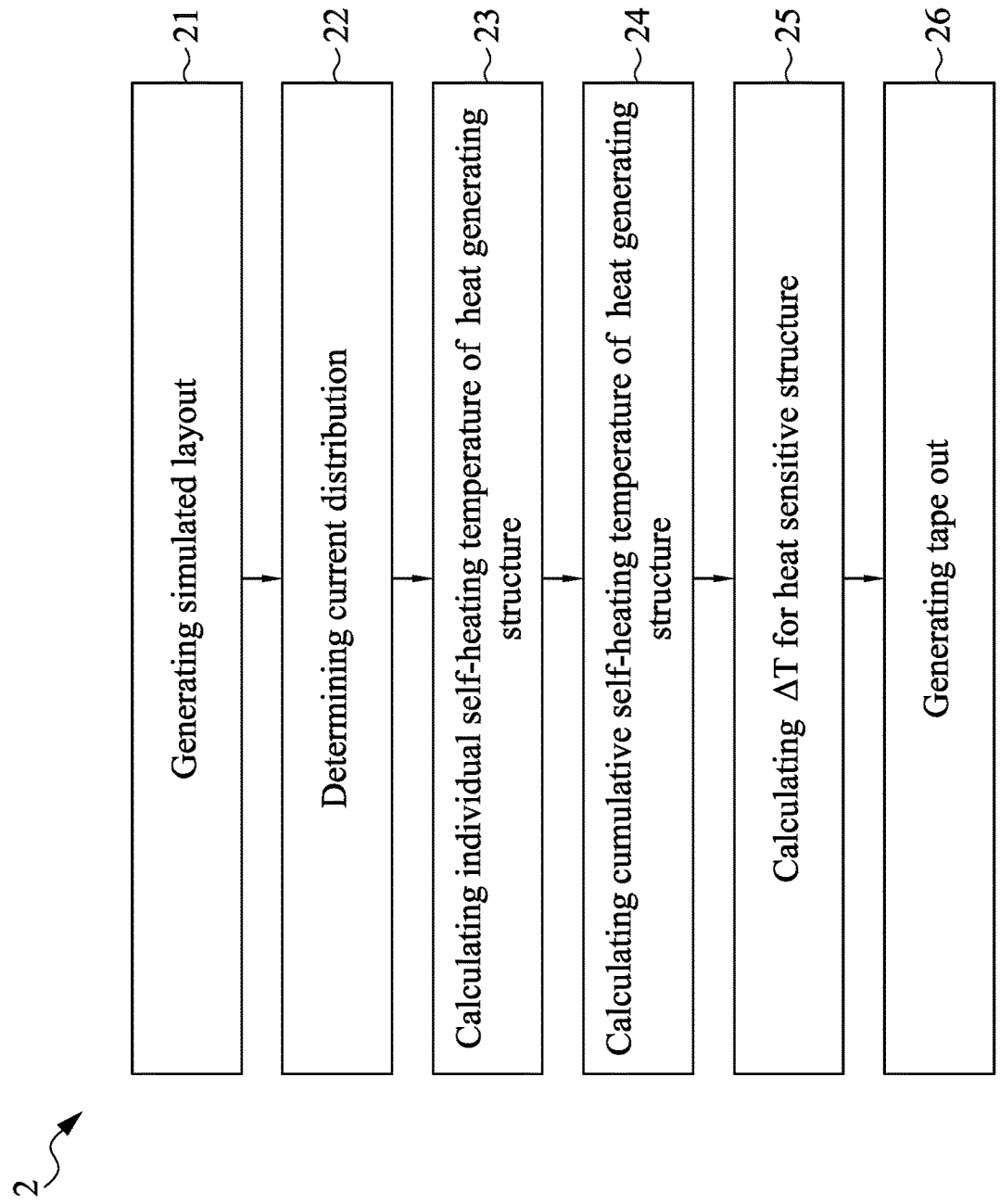
FIG. 2 is a flowchart of an EM evaluation method in accordance with some embodiments of the present disclosure.
Figure 3:
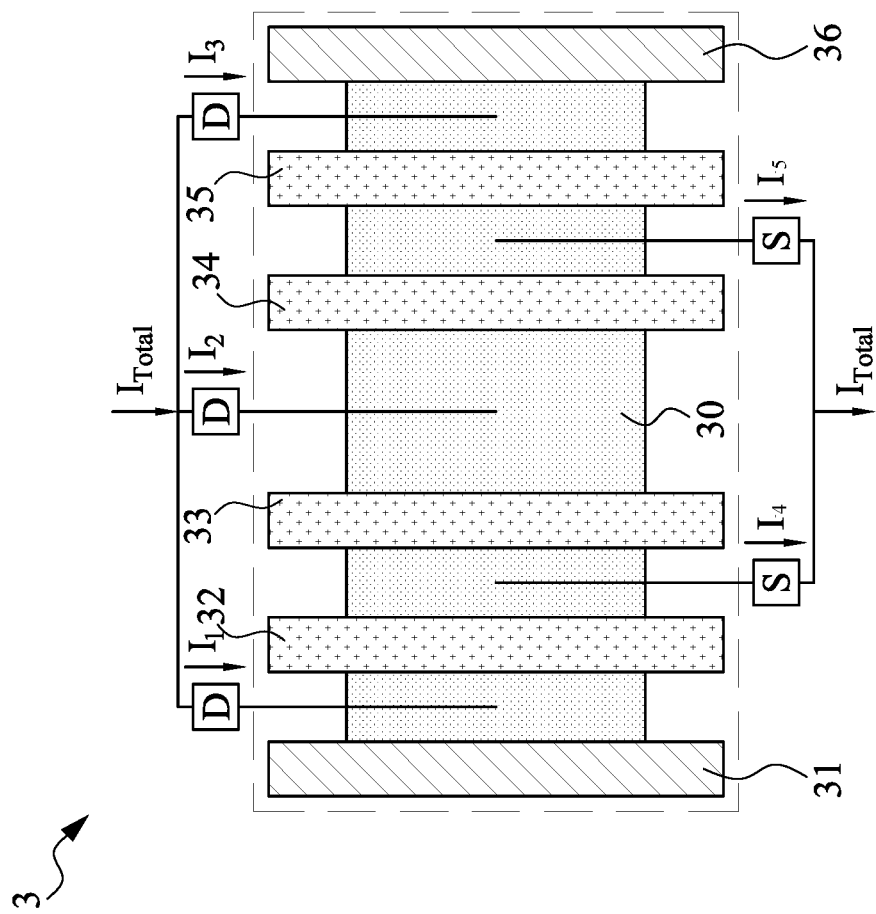
FIG. 3 shows a simulated integrated circuit design layout in accordance with some embodiments of the present disclosure.

FIG. 2 is a flowchart 2 showing an EM evaluation method in accordance with some embodiments of the present disclosure. FIG. 3 is a simulated integrated circuit design layout 3 in accordance with some embodiments of the present disclosure.

The EM evaluation method of FIG. 2 is detailed here with respect to the simulated integrated circuit design layout 3 of FIG. 3. However, the present disclosure is not limited thereto. In some embodiments, the EM sign-off methodology of the present disclosure may be applied on any suitable simulated integrated circuit design layout.

The EM evaluation method may begin in operation 21, generating a simulated integrated circuit design layout. For example, the simulated integrated circuit design layout 3 as shown in FIG. 3 may be generated by a data storage device for storing design data corresponding to an integrated circuit layout.

In some embodiments, during a structural and/or operational review of a simulated integrated circuit design layout that is under evaluation, one or more temperature sensitive structures and one or more heat generating structures may be identified. For example, structures for which an increased operating temperature will degrade performance and/or lifetime, may be identified as temperature sensitive structures, such as transistors and conductive lines. For example, proximate structures surrounding and/or adjacent to the temperature sensitive structure may be evaluated for identification as heat generating structures.

In order to be identified as a heat generating structure, a proximate structure can exhibit at least one of the following properties: (1) an operating temperature that meets or exceeds a predetermined temperature level above the anticipated operating temperature of the temperature sensitive structure; and (2) a location within the impact area defined by the temperature sensitive structure (or by the heat generating structure) that allows thermal coupling between the heat generating structure and the temperature sensitive structure. Proximate structures having or exhibiting an operating temperature and location sufficient to meet the noted properties are then identified as heat generating structures.

In some embodiments, an electronic design automation (EDA) (also referred to as electronic computer-aided design (EGAD)) tool may be used to identify potential heat generating structures.

The simulated integrated circuit design layout 3 may be a simulated integrated circuit design layout of a FinFET semiconductor device, and may be identified as a heat generating structure. In some embodiments, the simulated integrated circuit design layout 3 may further include a layout for a heat sensitive structure (such as the conductive line segment 12 of FIG. 1, not shown of FIG. 3).

In some embodiments, a FinFET semiconductor device includes a substrate in which is formed an active region in which a source and drain are formed, a guard ring, a plurality of conductive line layers separated by layers of ILD material(s), and vias formed through the ILD materials to establish electrical connections to and between the conductive line layers. Depending on the particular integrated circuit design, heat generated within the active regions of the FinFET semiconductor device will reach portions of the conductive line layers that are within the active region impact range and, to some extent, through the vias connecting the conductive lines to the active region.

In some embodiments, the FinFET semiconductor device of FIG. 3 includes an active area or oxide definition (OD)

area 30, polysilicon gate(s) (PO) 32, 33, 34, and 35, polysilicon gate(s) over diffusion edge (PODE) 31, 36, source(s) S, and drain(s) D. In some embodiments, there may be any number of OD areas, PO, PODE, sources, and drains in the FinFET semiconductor device of FIG. 3 based on design requirements.

In operation 22, a current distribution of the simulated integrated circuit design layout 3 may be determined. For example, a current distribution among currents $I_1$, $I_2$, and $I_3$ may be determined.

In some embodiments, total current $I_{total}$ may flow into the simulated integrated circuit design layout 3 through the drain D. In some embodiments, an individual current path of the simulated integrated circuit design layout 3 may be from a drain D to a source S controlled by a PO. In another example, the simulated integrated circuit design layout 3 can include a current path from the current $I_1$ through PO 32 to the current $I_4$, a current path from the current $I_2$ through PO 33 to the current $I_4$, a current path from the current $I_2$ through PO 34 to the current $I_5$, and a current path from the current $I_3$ through PO 35 to the current $I_5$.

In the simulated integrated circuit design layout 3, the current $I_1$ flows along one current path and the current $I_3$ flows along another one current path. The current $I_2$ contributes to two current paths.

In some embodiments, the current distribution among the currents $I_1$, $I_2$, and $I_3$ may be determined to be one third (⅓) of the total current $I_{total}$. However, since the current $I_2$ contributes to two current paths, the practical current $I_2$ is twice the current $I_1$ and the current $I_3$, and thus the current distribution among the currents $I_1$, $I_2$, and $I_3$ may not be equitable. In this embodiment, the underestimated current $I_2$ may be about 33 percent (%) of the practical current $I_2$.

EM evaluation methods not identifying and compensating for the increased operating temperature of the heat generating structure in the simulated integrated circuit design layout resulting from or induced by current distribution present an increased risk of underestimating self-heating effects (and also the thermal coupling) of the simulated integrated circuit design layout 3 and the conductive line operating temperature. In some embodiments, underestimating the self-heating effects and the conductive line operating temperature may, in turn, produce an EM evaluation result that is overly optimistic, tending to overestimate the average lifetime of semiconductor devices manufactured to that design, and resulting in premature field failures of the affected semiconductor devices.

In order to provide a reasonable and prudent estimate regarding the self-heating effects and the thermal coupling from the heat generating structures, EM evaluation method takes the practical current distribution into consideration. In some embodiments, a current of an individual current path in the simulated integrated circuit design layout 3 may be calculated based on the practical current distribution.

In some embodiments, a practical current for an individual current path of the simulated integrated circuit design layout 3 may be represented by the following formula (or equation) Eq. 1:

$$I_{MD}(i) = f(I_{total}, \#_{PO}, \#_{PODE}, \#_{SOURCE}, \#_{DRAIN}, i) \qquad [\text{Eq. 1}]$$

In some embodiments, the relevant values and/or parameters included in the formula Eq. 1 are provided by the foundry, incorporated in the applicable design rules, or extracted from the integrated circuit layout and include:

$I_{total}$: total current running through the simulated integrated circuit design layout 3;
$\#_{PO}$: number of PO;
$\#_{PODE}$: number of PODE;
$\#_{SOURCE}$: number of sources;
$\#_{DRAIN}$: number of drains;
i: location of an individual current path.

In some embodiments, the formula Eq. 1 may further include other values and/or parameters corresponding to the practical current distribution.

By recognizing and determining the practical current distribution of heat generating structures, the EM evaluation according to some embodiments of the present disclosure provides a more grounded and accurate estimate of the anticipated performance of the semiconductor device, thereby increasing the likelihood that semiconductor devices can meet or exceed customer expectations.

In operation 23, an individual self-heating temperature of the simulated integrated circuit design layout 3 can be calculated. For example, the individual self-heating temperature $\Delta T_i$ for an individual current path of the simulated integrated circuit design layout 3 may be calculated using the device temperature formula Eq. 2:

$$\Delta T_i = R_{THC} \times \text{finger\_effect} \times \text{fin\_effect} \times power_{per\_fin/per\_finger} \qquad [\text{Eq. 2}]$$

In some embodiments, the relevant values and/or parameters included in the formula Eq. 2 are provided by the foundry, incorporated in the applicable design rules, or extracted from the integrated circuit layout and include:

$R_{THC}$: thermal resistance value (may be provided by foundry); finger-effect: a function of gate finger number, cross-coupling of gate finger, etc.;
fin-effect: a function of fin number, fin width, etc.;
$Power_{per\_fin/per\_finger}$: a function of $I_{MD}$ (watt).

In some embodiments, as mentioned, the $I_{MD}$ takes current distribution into consideration. Therefore, the individual self-heating temperature $\Delta T_i$ for an individual current path of the simulated integrated circuit design layout 3 takes current distribution into consideration.

In some embodiments, the device temperature formula Eq. 2 may be provided as part of the design tool set provided by a semiconductor device foundry including, for example, a Simulation Program with Integrated Circuit Emphasis (SPICE) model corresponding to a particular manufacturing process.

In operation 24, a cumulative self-heating temperature $\Delta T_{OD}$ of the simulated integrated circuit design layout 3 can be calculated.

In some embodiments, the cumulative self-heating temperature $\Delta T_{OD}$ may be calculated based on the individual self-heating temperature $\Delta T_i$ obtained in operation 23. In some embodiments, the cumulative self-heating temperature $\Delta T_{OD}$ is a function of the individual self-heating temperature $\Delta T_i$ calculations for each of the structures (such as PO 32, 33, 34, and 35, and the PODE 31, 36) incorporated within the OD area 30. In some embodiments, the cumulative self-heating temperature $\Delta T_{OD}$ may include an operating temperature of the heat generating structure.

In some embodiments, this cumulative self-heating temperature $\Delta T_{OD}$ may then be used in subsequent calculations for evaluating the magnitude of thermal coupling between the OD area 30 and heat sensitive structures proximate to the simulated integrated circuit design layout 3.

In operation 25, an anticipated temperature increase $\Delta T_{Con}$ for a heat sensitive structure proximate to the simulated integrated circuit design layout 3 may be calculated.

In some embodiments, the anticipated temperature increase $\Delta T_{Con}$ for a heat sensitive structure, e.g., a conductive line, may be a function of both self-heating of the heat sensitive structure and the thermal contribution(s) (or thermal coupling(s)) from other heat generating structures proximate to the heat sensitive structure. In some embodiments, the anticipated temperature increase $\Delta T_{Con}$ for a heat sensitive structure may be calculated according to the formula Eq. 3:

$$\Delta T_{Con} = \Delta T_{rms} + f(a, b, \Delta T_{OD}, c, d, \Delta T_{Hi-R}, \Delta T_{other\_devices}) \quad [\text{Eq. 3}]$$

In some embodiments, the relevant values and/or parameters included in the formula Eq. 3 are provided by the foundry, incorporated in the applicable design rules, or extracted from the integrated circuit layout and may include:
  $\Delta T_{rms}$: current-induced metal heating temperature of a heat sensitive structure;
  $\Delta T_{OD}$: cumulative self-heating temperature of a FinFET semiconductor device;
  $\Delta T_{Hi-R}$: self-heating temperature of a Hi-R device;
  $\Delta T_{other\_devices}$: self-heating temperature from other devices.

For the purposes of the anticipated temperature increase $\Delta T_{Con}$ calculation according to formula Eq. 3, other devices can include, for example, bipolar junction transistors (BJT), diodes, and resistors that are thermally coupled to the heat sensitive structure under analysis.

The thermal coefficients a b, c, and d reflect:
  a=a derating coefficient (or de-rating coefficient) value reflecting operation at less than maximum capacity;
  b=a function of $\Delta T_{rms}$ and $\Delta T_{OD}$ [$f(\Delta T_{rms}, \Delta T_{OD})$];
  c=a layer effect associated with the layer/material;
  d=a temperature profile associated with the layer/material.

In some embodiments, the thermal coefficients, a, b, c, and d may be specific to each of the materials and/or layers incorporated in the simulated integrated circuit design layout and to the particular manufacturing process used to produce semiconductor devices according to the simulated integrated circuit design layout.

In some embodiments, adjustment of the anticipated temperature increase $\Delta T_{Con}$ for the heat sensitive structure by the thermal contribution(s) may provide a more accurate analysis of the anticipated performance of the semiconductor device. In some embodiments, the range over which thermal coupling is expected to occur between a heat generating structure and the heat sensitive structure (which may also be referred to as the impact range or thermal coupling range), is defined by a horizontal distance from the associated heat generating structure. For example, the formula Eq. 3 may include the thermal contribution(s) based on the location of the heat sensitive structure with respect to the heat generating structure (such as the Hi-R impact area and the active region impact area). For example, the formula Eq. 3 may include the thermal contribution(s) from the impact areas associated with two or more heat generating structures overlapping at least in part (i.e., a combined impact area).

In some embodiments, the anticipated temperature increase $\Delta T_{Con}$ may be used to evaluate the heat sensitive structure at an evaluation temperature.

In operation 26, a tape out data file corresponding to an integrated circuit layout that passes the EM analysis may be generated.

In some embodiments, the EM methodologies detailed can be applied to any integrated circuit design layout and/or semiconductor manufacturing process in which self-heating effects are anticipated. In some embodiments, the integrated circuit design layouts can include FinFET devices and/or other planar or more complex structural semiconductor manufacturing processes.

In some embodiments, the self-heating aware EM evaluation identifies those regions, if any, of the integrated circuit design layout in which the self-heating effects result in localized heating, e.g., a "hotspot," that will reduce overall EM performance and/or lifetime of semiconductor devices manufactured according to the integrated circuit design. In some embodiments, the initial self-heating aware EM evaluation is coupled with a heat sink-aware EM evaluation in order to determine if one or more surrounding structures is capable of mitigating the self-heating effects and/or thermal coupling effects previously identified and thereby improving the EM performance of the integrated circuit design layout.

Figure 4:
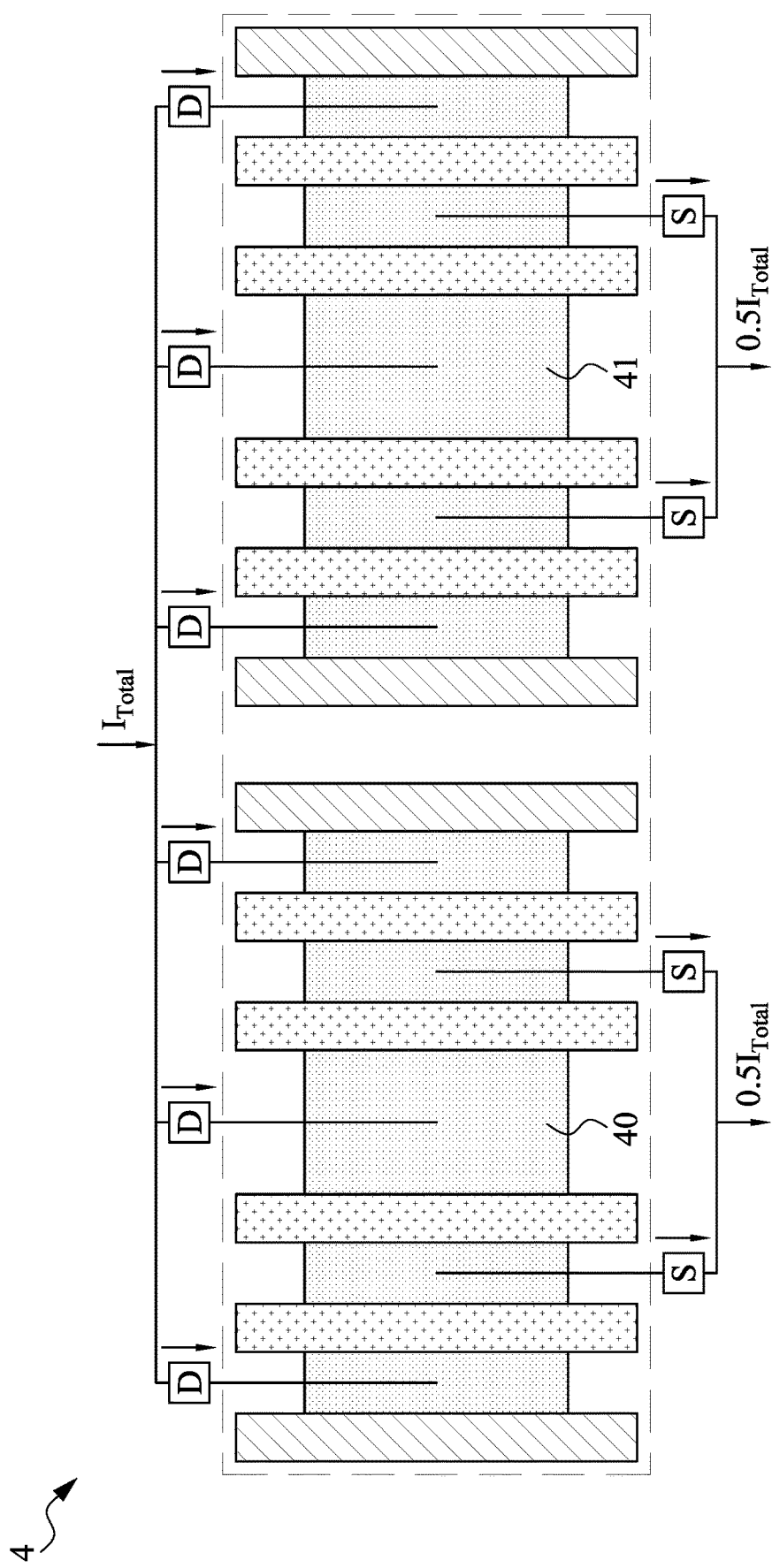
FIG. 4 shows a simulated integrated circuit design layout in accordance with some embodiments of the present disclosure.

FIG. 4 is a simulated integrated circuit design layout 4 in accordance with some embodiments of the present disclosure.

The simulated integrated circuit design layout 4 of FIG. 4 is similar to the simulated integrated circuit design layout of FIG. 3, with differences therebetween as follows.

In some embodiments, the simulated integrated circuit design layout 4 includes two FinFET semiconductor devices of FIG. 3 in parallel. The FinFET semiconductor device of FIG. 4 includes an OD area 40 and an OD area 41 spaced apart from the OD area 40.

When applying the EM evaluation method of FIG. 2 to the simulated integrated circuit design layout 4, the number of the OD areas may be taken into consideration.

For example, a practical current for an individual current path of the simulated integrated circuit design layout 4 may be represented by the following formula Eq. 4:

$$I_{MD}(i) = f(I_{total}, \#_{PO}, \#_{PODE}, \#_{SOURCE}, \#_{DRAIN}, \#_{OD}, i) \quad [\text{Eq. 4}]$$

In some embodiments, the relevant values and/or parameters included in the formula Eq. 4 are provided by the foundry, incorporated in the applicable design rules, or extracted from the integrated circuit layout and include:
  $I_{total}$: total current running through the simulated integrated circuit design layout 4;
  $\#_{PO}$: number of PO;
  $\#_{PODE}$: number of PODE;
  $\#_{SOURCE}$: number of source;
  $\#_{DRAIN}$: number of drain;
  $\#_{OD}$: number of OD area;
  i: location of an individual current path.

Figure 5:
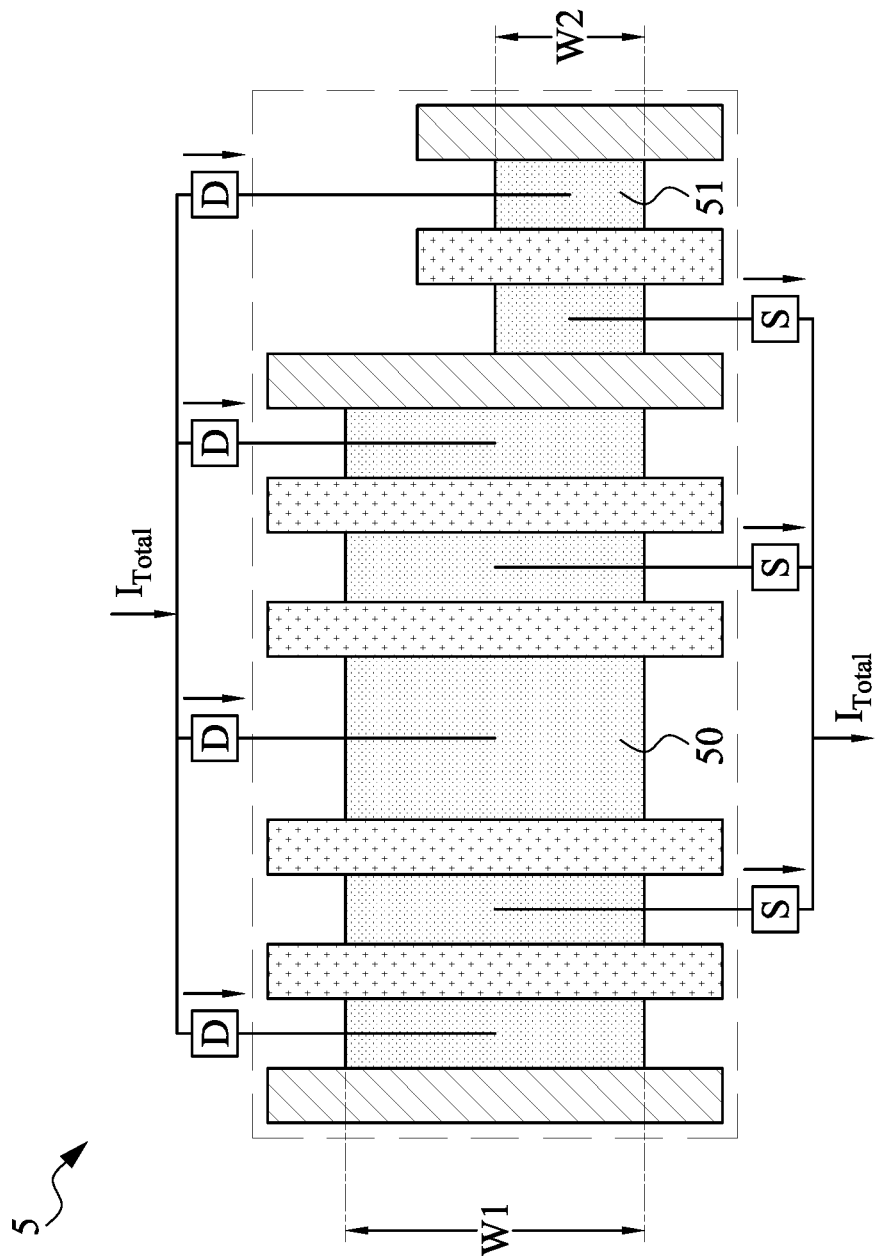
FIG. 5 shows a simulated integrated circuit design layout in accordance with some embodiments of the present disclosure.

FIG. 5 is a simulated integrated circuit design layout 5 in accordance with some embodiments of the present disclosure.

The simulated integrated circuit design layout 5 of FIG. 5 is similar to the simulated integrated circuit design layout of FIG. 3, with differences therebetween as follows.

In some embodiments, the simulated integrated circuit design layout 5 includes an OD area 50 having a width W1 and an OD area 51 having a width W2. The width W2 is different from the width W1. The width may be measured in a direction along the length side of the PO.

When applying the EM evaluation method of FIG. 2 to the simulated integrated circuit design layout 5, the width of the OD area may be taken into consideration.

For example, a practical current for an individual current path of the simulated integrated circuit design layout 5 may be represented by the following formula Eq. 5:

$$I_{MD}(i) = f(I_{total}, \#_{PO}, \#_{PODE}, \#_{SOURCE}, \#_{DRAIN}, W_{FIN}, i) \quad [\text{Eq. 5}]$$

In some embodiments, the relevant values and/or parameters included in the formula Eq. 5 are provided by the foundry, incorporated in the applicable design rules, or extracted from the integrated circuit layout and include:

$I_{total}$: total current running through the simulated integrated circuit design layout 5;
$\#_{PO}$: number of PO;
$\#_{PODE}$: number of PODE;
$\#_{SOURCE}$: number of sources;
$\#_{DRAIN}$: number of drains;
$W_{FIN}$: width of OD area (or fin structure);
i: location of an individual current path.

Figure 6:
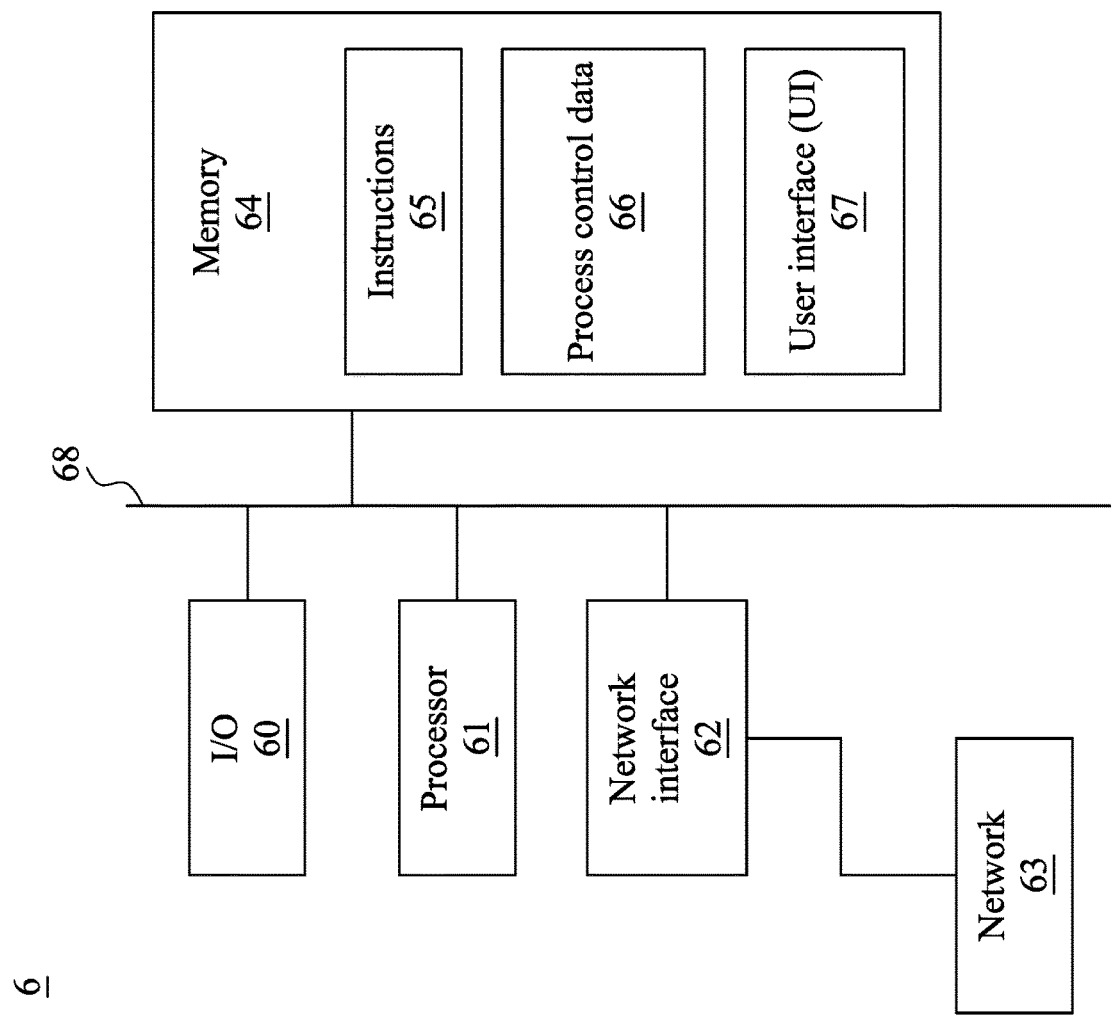
FIG. 6 is a block diagram of an electronic process control (EPC) system in accordance with some embodiments of the present disclosure.

FIG. 6 is a block diagram of an electronic process control (EPC) system 6 in accordance with some embodiments of the present disclosure.

EM evaluation, analysis, and signoff methodologies (such as the EM evaluation method of FIG. 2) described herein are implementable, for example, using EPC system 6, in accordance with some embodiments.

In some embodiments, EPC system 6 may be a general purpose computing device including an I/O interface 60, a hardware processor 61, a network interface 62, a memory 64, and a bus 68.

In some embodiments, the I/O interface 60 may be coupled to an external circuitry. In some embodiments, the EPC system 6 may be configured to receive information through the I/O interface 60. The information received through the I/O interface 60 may include one or more of instructions, data, design rules, process performance histories, target ranges, set points, and/or other parameters for processing by the hardware processor 61. The information may be transferred to the hardware processor 61 via the bus 68. The EPC system 6 may be configured to receive information related to a user interface (UI) through the I/O interface 60. The information may be stored in the memory 64 as user interface (UI) 67.

In one or more embodiments, the I/O interface 60 may include a keyboard, keypad, mouse, trackball, trackpad, touchscreen, and/or cursor direction keys for communicating information and commands to the hardware processor 61.

In some embodiments, the hardware processor 61 may be configured to execute instructions (which may be referred to as computer program code) 65 encoded in the memory 64 in order to cause EPC system 1100 to be usable for performing a portion or all of the EM evaluation, analysis, and signoff methodologies (such as the EM evaluation method of FIG. 2) described herein.

In some embodiments, the hardware processor 61 may be a central processing unit (CPU), a multiprocessor, a distributed processing system, an application specific integrated circuit (ASIC), and/or a suitable processing unit.

In some embodiments, the network interface 62 may be coupled to the hardware processor 61 through the bus 68. The network interface 62 may allow the EPC system 6 to communicate with network 63, to which one or more other computer systems are connected. Network interface 63 may include wireless network interfaces such as BLUETOOTH, WIFI, WIMAX, GPRS, or WCDMA; or wired network interfaces such as ETHERNET, USB, or IEEE-1364.

In some embodiments, the memory (which may be referred to as a non-transitory, computer-readable storage medium) 64, amongst other things, may be encoded with, i.e., stores, instructions (or computer program code) 65, such as a set of executable instructions. Execution of computer program code 1106 by the hardware processor 61 implements a portion or all of the EM evaluation, analysis, and signoff methodologies (such as the EM evaluation method of FIG. 2) described herein.

In some embodiments, the memory 64, amongst other things, may store formulas (such as the formulas Eqs. 1-5), design data corresponding to a simulated integrated circuit design layout, and models for calculating a simulated operating temperature (such as a pseudo-3-D thermal model or other suitable model). In some embodiments, the design data may utilize Open Artwork System Interchange Standard (OASIS) or another language for representing the integrated circuit design layout.

In some embodiments, the memory 64, amongst other things, may also store information which facilitates performing a portion or all of the EM evaluation, analysis, and signoff methodologies (such as the EM evaluation method of FIG. 2) described herein. In some embodiments, the memory 64 may store process control data 66 including, in some embodiments, control algorithms, process variables and constants, target ranges, set points, and code for enabling statistical process control (SPC) and/or model predictive control (MPC) based control of the various processes.

In some embodiments, the memory 64 may be an electronic, magnetic, optical, electromagnetic, infrared, and/or a semiconductor system (or apparatus or device). For example, the memory 64 may include a semiconductor or solid-state memory, a magnetic tape, a removable computer diskette, a random access memory (RAM), a read-only memory (ROM), a rigid magnetic disk, and/or an optical disk. In one or more embodiments using optical disks, the memory 64 may include a compact disk-read only memory (CD-ROM), a compact disk-read/write (CD-R/W), and/or a digital video disc (DVD).

In some embodiments, a portion or all of the EM evaluation, analysis, and signoff methodologies (such as the EM evaluation method of FIG. 2) described herein may be implemented as a standalone software application for execution by a processor. In some embodiments, a portion or all of the EM evaluation, analysis, and signoff methodologies (such as the EM evaluation method of FIG. 2) described herein may be implemented as a software application that is a part of an additional software application. In some embodiments, a portion or all of the EM evaluation, analysis, and signoff methodologies (such as the EM evaluation method of FIG. 2) described herein may be implemented as a plugin for a software application. In some embodiments, at least one of the EM evaluation, analysis, and signoff methodologies (such as the EM evaluation method of FIG. 2) described herein may be implemented as a software application that is a portion of an EPC tool. In some embodiments, a portion or all of the EM evaluation, analysis, and signoff methodologies (such as the EM evaluation method of FIG. 2) described herein may be implemented as a software application that is used by the EPC system 6.

In some embodiments, the processes of the EM evaluation, analysis, and signoff methodologies (such as the EM evaluation method of FIG. 2) described herein are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Some embodiments of the present disclosure provide a method for evaluating a heat sensitive structure. The method includes identifying a heat sensitive structure in an integrated circuit design layout and identifying a heat generating structure in the integrated circuit design layout. The method also includes calculating an operating temperature of the heat generating structure by taking a practical current distribution into consideration. The method also includes calculating an anticipated temperature increase for the heat sensitive structure induced by thermal coupling of the heat generating structure at the operating temperature.

Some embodiments of the present disclosure provide a method for evaluating a heat sensitive structure. The method includes identifying a FinFET structure in an integrated circuit design layout. The FinFET structure includes a first OD area and a second OD area spaced apart from the first OD area. The method also includes determining a practical current distribution of the FinFET structure by taking an OD area number of the FinFET structure into consideration. The method also includes calculating an operating temperature of the FinFET structure based on the practical current distribution.

Some embodiments of the present disclosure provide a method for evaluating a heat sensitive structure. The method includes identifying a FinFET structure in an integrated circuit design layout. The FinFET structure includes a first fin structure having a first width and a second fin structure having a second width different from the first width of the first fin structure. The method also includes determining a practical current distribution of the FinFET structure by taking the first width and the second width of the FinFET structure into consideration. The method also includes calculating an operating temperature of the FinFET structure based on the practical current distribution.

The methods and features of the present disclosure have been sufficiently described in the above examples and descriptions. It should be understood that any modifications or changes without departing from the spirit of the present disclosure are intended to be covered in the protection scope of the present disclosure.

Moreover, the scope of the present application in not intended to be limited to the particular embodiments of the process, machine, manufacture, and composition of matter, means, methods and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding embodiments described herein, may be utilized according to the present disclosure.

Accordingly, the appended claims are intended to include within their scope: processes, machines, manufacture, compositions of matter, means, methods or steps. In addition, each claim constitutes a separate embodiment, and the combination of various claims and embodiments are within the scope of the present disclosure.

What is claimed is:

1. A method for evaluating a heat sensitive structure, comprising:
   identifying a heat sensitive structure in an integrated circuit design layout;
   identifying a heat generating structure in the integrated circuit design layout;
   calculating an operating temperature of the heat generating structure by taking a practical current distribution into consideration; and
   calculating an anticipated temperature increase for the heat sensitive structure induced by thermal coupling of the heat generating structure at the operating temperature,
   wherein the practical current distribution includes a first current path and a second current path running into the heat generating structure, and a current passing through the first current path is different from a current passing through the second current path.

2. The method of claim 1, further comprising:
   retrieving design data corresponding to the integrated circuit design layout from a database; and
   analyzing the design data to identify the heat sensitive structure and the heat generating structure.

3. The method of claim 1, further comprising:
   evaluating the heat sensitive structure at an evaluation temperature based on the anticipated temperature increase.

4. The method of claim 3, wherein:
   the heat sensitive structure includes a conductive line; and
   evaluating the heat sensitive structure includes an electromigration (EM) analysis of the conductive line.

5. The method of claim 4, further comprising:
   verifying that the conductive line passes the EM analysis; and
   manufacturing a semiconductor device according to the integrated circuit design layout.

6. The method of claim 1, wherein the heat generating structure includes a fin field effect transistor (FinFET) structure.

7. The method of claim 6, wherein calculating the operating temperature of the heat generating structure by taking the practical current distribution into consideration comprises:
   determining a total current running through the FinFET structure, a polysilicon gate (PO) number of the FinFET structure, a polysilicon gate over diffusion edge (PODE) number of the FinFET structure, a source number of the FinFET structure, and a drain number of the FinFET structure.

8. The method of claim 6, wherein calculating the operating temperature of the heat generating structure by taking the practical current distribution into consideration comprises:
   determining a location of an individual current path of the FinFET structure; and
   calculating a practical current for the individual current path of the FinFET structure.

9. The method of claim 6, further comprising:
   calculating the operating temperature of the FinFET structure by taking an oxide definition (OD) area number of the FinFET structure into consideration.

10. The method of claim 6, further comprising:
    calculating the operating temperature of the FinFET structure by taking a fin structure width of a fin structure of the FinFET structure into consideration.

11. The method of claim 10, wherein the FinFET structure includes a first fin structure having a first fin structure width and a second fin structure having a second fin structure width different from the first fin structure width of the first fin structure.

12. The method of claim 1, wherein the operating temperature of the heat generating structure exceeds a predetermined temperature level above the anticipated temperature of the heat sensitive structure.

13. The method of claim 1, wherein the current passing through the second current path is substantially twice the current passing through the first current path.

14. The method of claim 13, wherein the practical current distribution includes a third current path running into the heat generating structure, and a current passing through the third current path is substantially the same as the current passing through the first current path.

15. The method of claim 1, further comprising:
calculating a current-induced metal heating temperature increase for the heat sensitive structure.

16. A method for evaluating a heat sensitive structure, comprising:
identifying a heat sensitive structure in an integrated circuit design layout;
identifying a FinFET structure in the integrated circuit design layout;
calculating an operating temperature of the FinFET structure by taking a practical current distribution into consideration; and
calculating an anticipated temperature increase for the heat sensitive structure induced by thermal coupling of the FinFET structure at the operating temperature,
wherein calculating the operating temperature of the FinFET structure by taking the practical current distribution into consideration comprises:
determining a total current running through the FinFET structure, a polysilicon gate (PO) number of the FinFET structure, a polysilicon gate over diffusion edge (PODE) number of the FinFET structure, a source number of the FinFET structure, and a drain number of the FinFET structure.

17. The method of claim 16, wherein calculating the operating temperature of the FinFET structure by taking the practical current distribution into consideration further comprises:
determining locations of a plurality of individual current paths of the FinFET structure.

18. The method of claim 17, wherein calculating the operating temperature of the FinFET structure by taking the practical current distribution into consideration further comprises:
calculating self-heating temperatures for the plurality of individual current paths of the FinFET structure.

19. A method for evaluating a heat sensitive structure, comprising:
identifying a heat sensitive structure in an integrated circuit design layout;
identifying a FinFET structure in the integrated circuit design layout;
calculating an operating temperature of the FinFET structure by taking an oxide definition (OD) area number of the FinFET structure into consideration; and
calculating an anticipated temperature increase for the heat sensitive structure induced by thermal coupling of the FinFET structure at the operating temperature,
wherein the FinFET structure includes a first OD area and a second OD area spaced apart from the first OD area.

20. The method of claim 19, wherein the first OD area has a first OD area width and the second OD area has a second OD area width different from the first OD area width of the first OD area.

* * * * *